(12) United States Patent
McSheffrey

(10) Patent No.: US 8,749,373 B2
(45) Date of Patent: Jun. 10, 2014

(54) EMERGENCY EQUIPMENT POWER SOURCES

(75) Inventor: Brendan T. McSheffrey, Newton, MA (US)

(73) Assignee: en-Gauge, Inc., Rockland, MA (US)

( * ) Notice: Subject to any disclaimer, the term of this patent is extended or adjusted under 35 U.S.C. 154(b) by 618 days.

(21) Appl. No.: 12/371,341

(22) Filed: Feb. 13, 2009

(65) Prior Publication Data

US 2009/0237239 A1 Sep. 24, 2009

Related U.S. Application Data

(60) Provisional application No. 61/028,484, filed on Feb. 13, 2008.

(51) Int. Cl.
*G08B 1/08* (2006.01)

(52) U.S. Cl.
USPC .............. 340/539.1; 169/23; 169/30; 169/56; 169/60; 169/61; 342/27; 342/28; 342/76; 340/436; 340/904; 307/25; 307/43

(58) Field of Classification Search
USPC ....................................................... 340/539.1
See application file for complete search history.

(56) References Cited

U.S. PATENT DOCUMENTS

| | | | |
|---|---|---|---|
| 50,581 A | 10/1865 | Henis | |
| 558,643 A | 4/1896 | Fennessy | |
| 768,109 A | 8/1904 | Ballard et al. | |
| 922,456 A | 5/1909 | Casey | |
| 1,825,367 A | 9/1931 | Schilling | |
| 1,950,142 A | 3/1934 | Hastings et al. | |
| 2,189,991 A | 2/1940 | Muller | |
| 2,550,157 A | 4/1951 | Mazza | |
| 2,670,194 A | 2/1954 | Hansson | |
| 2,710,666 A | 6/1955 | May | |
| 2,920,641 A | 1/1960 | Girolo | |
| 3,145,375 A | 8/1964 | Webb | |
| 3,283,578 A | 11/1966 | Moore | |
| 3,333,641 A | 8/1967 | Hansom | |
| 3,407,665 A | 10/1968 | Noakes et al. | |
| 3,664,430 A | 5/1972 | Sitabkhan | |
| 3,710,613 A | 1/1973 | Innes et al. | |
| 3,735,376 A | 5/1973 | Kermer et al. | |

(Continued)

FOREIGN PATENT DOCUMENTS

| | | |
|---|---|---|
| DE | 3731793 | 3/1989 |
| FR | 2340109 | 9/1977 |

(Continued)

OTHER PUBLICATIONS

""""Exciting new Products for Measuring Flow and Pressure"""", Cole-Parmer Brochure Canada NPL-3 Apr. 23, 1996 , 1 pg.

(Continued)

*Primary Examiner* — George Bugg
*Assistant Examiner* — Anthony D Afrifa-Kyei
(74) *Attorney, Agent, or Firm* — Strategic Patents, P.C.

(57) ABSTRACT

Energy harvesting devices provide power to devices of emergency equipment stations (e.g., fire extinguisher station, fire alarm pull station, defibrillator station, etc.) distributed throughout a facility to monitor one or more internal or external conditions (e.g., identifiable objects detected near the station, presence of an obstruction restricting access to the station, etc.) and relay information about the monitored conditions to a central station.

11 Claims, 5 Drawing Sheets

(56) References Cited

U.S. PATENT DOCUMENTS

| | | |
|---|---|---|
| 3,773,145 A | 11/1973 | Drexler |
| 3,946,175 A | 3/1976 | Sitabkhan |
| 3,954,612 A | 5/1976 | Wilkerson |
| 4,003,048 A | 1/1977 | Weise |
| 4,015,250 A | 3/1977 | Fudge |
| 4,034,697 A | 7/1977 | Russell |
| 4,051,467 A | 9/1977 | Galvin |
| 4,100,537 A | 7/1978 | Carlson |
| 4,101,887 A | 7/1978 | Osborne |
| 4,119,153 A | 10/1978 | Avant |
| 4,125,084 A | 11/1978 | Salmonsen et al. |
| 4,143,545 A | 3/1979 | Sitabkhan |
| 4,184,377 A | 1/1980 | Hubbard |
| 4,227,577 A | 10/1980 | Iida |
| 4,246,046 A | 1/1981 | Lameyer |
| 4,279,155 A | 7/1981 | Balkanli |
| 4,289,207 A | 9/1981 | Wernert |
| 4,300,311 A | 11/1981 | Marchant |
| 4,303,395 A | 12/1981 | Bower |
| 4,342,988 A | 8/1982 | Thompson et al. |
| 4,360,802 A | 11/1982 | Pinto |
| 4,384,486 A | 5/1983 | Eckert |
| 4,418,336 A | 11/1983 | Taylor |
| 4,419,658 A | 12/1983 | Jarosz et al. |
| 4,436,414 A | 3/1984 | Kamiyama et al. |
| 4,512,190 A | 4/1985 | Sledmere |
| 4,531,114 A | 7/1985 | Topol et al. |
| 4,548,274 A | 10/1985 | Simpson |
| 4,586,383 A | 5/1986 | Blomquist |
| 4,599,902 A | 7/1986 | Gray |
| 4,613,851 A | 9/1986 | Hines |
| 4,635,480 A | 1/1987 | Hrncir et al. |
| 4,697,643 A | 10/1987 | Sassier |
| 4,709,330 A | 11/1987 | Yokoi et al. |
| 4,805,448 A | 2/1989 | Armell |
| 4,823,116 A | 4/1989 | Kitchen, III et al. |
| 4,823,788 A | 4/1989 | Smith et al. |
| 4,833,469 A | 5/1989 | David |
| 4,835,522 A | 5/1989 | Andrejasich et al. |
| 4,866,423 A | 9/1989 | Anderson et al. |
| 4,887,291 A | 12/1989 | Stillwell |
| 4,890,677 A | 1/1990 | Scofield |
| 4,928,255 A | 5/1990 | Brennecke |
| 4,975,687 A | 12/1990 | Murphy, Jr. et al. |
| 4,979,572 A | 12/1990 | Mikulec |
| 5,020,367 A | 6/1991 | White |
| 5,027,871 A | 7/1991 | Guenther |
| 5,072,618 A | 12/1991 | Taylor et al. |
| 5,123,409 A | 6/1992 | Sheffield et al. |
| 5,124,686 A | 6/1992 | White et al. |
| 5,153,567 A | 10/1992 | Chimento |
| 5,153,722 A | 10/1992 | Goedeke et al. |
| 5,224,051 A | 6/1993 | Johnson |
| 5,305,639 A | 4/1994 | Pontefract |
| 5,339,074 A | 8/1994 | Shindley et al. |
| 5,357,242 A | 10/1994 | Morgano et al. |
| 5,388,570 A | 2/1995 | Wassil |
| 5,400,246 A | 3/1995 | Wilson et al. |
| 5,457,995 A | 10/1995 | Staton et al. |
| 5,460,228 A | 10/1995 | Butler |
| 5,472,012 A | 12/1995 | Wood et al. |
| 5,475,614 A | 12/1995 | Tofte et al. |
| 5,479,820 A | 1/1996 | Fekete |
| 5,483,826 A | 1/1996 | Schultz et al. |
| 5,486,811 A | 1/1996 | Wehrle et al. |
| 5,534,851 A | 7/1996 | Russek |
| 5,578,993 A | 11/1996 | Sitabkhan et al. |
| 5,589,639 A | 12/1996 | D'Antonio et al. |
| 5,593,426 A | 1/1997 | Morgan et al. |
| 5,596,501 A | 1/1997 | Comer et al. |
| 5,613,778 A | 3/1997 | Lawson |
| 5,652,393 A | 7/1997 | Lawson |
| 5,706,273 A | 1/1998 | Guerreri |
| 5,728,933 A | 3/1998 | Schultz et al. |
| 5,775,430 A | 7/1998 | McSheffrey |
| 5,781,108 A | 7/1998 | Jacob et al. |
| 5,793,280 A | 8/1998 | Hincher |
| 5,808,541 A | 9/1998 | Golden |
| 5,816,224 A | 10/1998 | Welsh et al. |
| 5,829,465 A | 11/1998 | Garretson |
| 5,848,651 A | 12/1998 | McSheffrey et al. |
| 5,853,244 A | 12/1998 | Hoff et al. |
| 5,864,287 A | 1/1999 | Evans, Jr. et al. |
| 5,874,899 A | 2/1999 | Barmore, Jr. et al. |
| 5,877,426 A | 3/1999 | Hay et al. |
| 5,936,531 A | 8/1999 | Powers |
| 5,952,919 A | 9/1999 | Merrill |
| 6,014,307 A | 1/2000 | Crimmins |
| 6,104,301 A | 8/2000 | Golden |
| 6,114,823 A | 9/2000 | Doner et al. |
| 6,125,940 A | 10/2000 | Oram |
| 6,128,576 A | 10/2000 | Nishimoto et al. |
| 6,137,417 A | 10/2000 | McDermott |
| 6,141,584 A | 10/2000 | Rockwell et al. |
| 6,155,160 A | 12/2000 | Hochbrueckner |
| 6,168,563 B1 | 1/2001 | Brown |
| 6,240,365 B1 | 5/2001 | Bunn |
| 6,270,455 B1 | 8/2001 | Brown |
| 6,279,664 B1 | 8/2001 | Yanovsky et al. |
| 6,289,331 B1 | 9/2001 | Pedersen et al. |
| 6,301,501 B1 | 10/2001 | Cronin et al. |
| 6,302,218 B1 | 10/2001 | McSheffrey et al. |
| 6,311,779 B2 * | 11/2001 | McSheffrey et al. ............ 169/23 |
| 6,317,042 B1 | 11/2001 | Engelhorn et al. |
| 6,327,497 B1 | 12/2001 | Kirchgeorg et al. |
| 6,336,362 B1 | 1/2002 | Duenas |
| 6,351,689 B1 | 2/2002 | Carr et al. |
| 6,357,292 B1 | 3/2002 | Schultz et al. |
| 6,401,713 B1 | 6/2002 | Hill et al. |
| 6,450,254 B1 | 9/2002 | Hoyle et al. |
| 6,488,099 B2 | 12/2002 | McSheffrey et al. |
| 6,496,110 B2 | 12/2002 | Peterson et al. |
| 6,522,531 B1 | 2/2003 | Quintana et al. |
| 6,529,590 B1 | 3/2003 | Centers |
| 6,542,076 B1 | 4/2003 | Joao |
| 6,556,981 B2 | 4/2003 | Pedersen et al. |
| 6,567,006 B1 | 5/2003 | Lander et al. |
| 6,585,055 B2 | 7/2003 | Mcsheffrey et al. |
| 6,587,049 B1 | 7/2003 | Thacker |
| 6,598,454 B2 | 7/2003 | Brazier et al. |
| 6,646,545 B2 | 11/2003 | Bligh |
| 6,647,762 B1 | 11/2003 | Roy |
| 6,735,473 B2 | 5/2004 | Kolder et al. |
| 6,766,688 B2 | 7/2004 | O'Shea |
| 6,772,260 B2 | 8/2004 | Kawase et al. |
| 6,853,309 B1 | 2/2005 | Schröter |
| 6,856,251 B1 | 2/2005 | Tietsworth et al. |
| 6,866,042 B2 | 3/2005 | Izuchukwu |
| 7,081,815 B2 * | 7/2006 | Runyon et al. ................. 340/541 |
| 7,111,510 B2 | 9/2006 | Tadoa et al. |
| 7,174,769 B2 | 2/2007 | McSheffrey, Jr. et al. |
| 7,174,783 B2 | 2/2007 | McSheffrey, Jr. et al. |
| 7,188,679 B2 | 3/2007 | McSheffrey et al. |
| 7,245,030 B2 * | 7/2007 | Nelson et al. ................. 290/1 A |
| 7,271,704 B2 | 9/2007 | McSheffrey et al. |
| 7,289,881 B2 | 10/2007 | Ota et al. |
| 7,450,020 B2 | 11/2008 | McSheffrey et al. |
| 7,574,911 B2 | 8/2009 | McSheffrey et al. |
| 7,726,411 B2 | 6/2010 | McSheffrey, Jr. et al. |
| 7,728,715 B2 | 6/2010 | Riedel et al. |
| 7,891,241 B2 | 2/2011 | McSheffrey et al. |
| 7,891,435 B2 | 2/2011 | McSheffrey et al. |
| 7,895,884 B2 | 3/2011 | McSheffrey, Jr. et al. |
| 7,961,089 B2 | 6/2011 | McSheffrey et al. |
| 8,009,020 B2 | 8/2011 | Riedel et al. |
| 2001/0025713 A1 | 10/2001 | Mcsheffrey |
| 2001/0052681 A1 | 12/2001 | Deavila |
| 2003/0071736 A1 | 4/2003 | Brazier et al. |
| 2003/0116329 A1 | 6/2003 | McSheffrey et al. |
| 2003/0135324 A1 | 7/2003 | Navab |
| 2003/0189492 A1 | 10/2003 | Harvie |
| 2004/0017471 A1 | 1/2004 | Suga et al. |
| 2004/0123486 A1 * | 7/2004 | Hameed et al. ................. 34/595 |
| 2004/0200058 A1 | 10/2004 | Fish |

(56) References Cited

U.S. PATENT DOCUMENTS

| | | |
|---|---|---|
| 2004/0265134 A1 | 12/2004 | Iimura et al. |
| 2005/0006109 A1 | 1/2005 | McSheffrey et al. |
| 2005/0124315 A1 | 6/2005 | Kageyama et al. |
| 2005/0174091 A1* | 8/2005 | Dayan et al. ............... 320/128 |
| 2005/0185606 A1 | 8/2005 | Rayment et al. |
| 2006/0027547 A1 | 2/2006 | Silvestro |
| 2006/0036515 A1 | 2/2006 | Ingalsbe et al. |
| 2006/0074513 A1 | 4/2006 | DeRose et al. |
| 2006/0131393 A1 | 6/2006 | Cok et al. |
| 2007/0050137 A1 | 3/2007 | Woon et al. |
| 2007/0141874 A1* | 6/2007 | Steigerwald et al. ......... 439/110 |
| 2008/0004798 A1* | 1/2008 | Troxler et al. ................. 701/207 |
| 2008/0232604 A1* | 9/2008 | Dufresne et al. ............... 381/67 |
| 2008/0313255 A1 | 12/2008 | Geltner et al. |
| 2010/0171624 A1 | 7/2010 | Mcsheffrey et al. |
| 2010/0192695 A1 | 8/2010 | Mcsheffrey et al. |
| 2010/0245570 A1 | 9/2010 | Riedel et al. |
| 2011/0109454 A1 | 5/2011 | Mcsheffrey, Sr. et al. |
| 2011/0241873 A1 | 10/2011 | Mcsheffrey et al. |
| 2011/0285847 A1 | 11/2011 | Riedel et al. |

FOREIGN PATENT DOCUMENTS

| | | |
|---|---|---|
| FR | 2515845 | 5/1983 |
| FR | 2676931 | 12/1992 |
| WO | WO-81/02484 | 9/1981 |
| WO | WO-94/11853 | 5/1994 |
| WO | WO-01/46780 | 6/2001 |
| WO | WO-01/93220 | 12/2001 |
| WO | WO-03/076765 | 9/2003 |
| WO | WO-03/098908 | 11/2003 |

OTHER PUBLICATIONS

"NFPA 10 Standard for Portable Fire Extinguishers", National Fire protection Association 1998 Edition NPL-2, pp. 10.1-10.56.

* cited by examiner

EMERGENCY EQUIPMENT POWER SOURCES

RELATED APPLICATION

Pursuant to 35 USC §119(e), this application claims the benefit of prior U.S. Provisional Application 61/028,484, filed Feb. 13, 2008, which is incorporated by reference in its entirety.

TECHNICAL FIELD

This description relates to providing power to emergency equipment and emergency equipment stations.

BACKGROUND

Over the past decades, the consumer electronics market has demonstrated a growth cycle that rivals most industries. Correspondingly, the need for energy to power this explosion of electronic consumer goods is proportional. Traditional electrical power (e.g. 120 volt, alternating circuit) provided a relatively continuous form of energy to residences and businesses from remotely located electrical power plants while energy storage devices such as batteries, while portable, provide power for finite time periods.

SUMMARY

The specification describes technology related to providing power to emergency equipment and emergency equipment stations.

In general, in one aspect, the specification describes a system including at least one energy harvesting device and at least one emergency equipment station that includes an emergency assistance device powered, at least in part, by the at least one energy harvesting device. The system also includes a central station located remotely from the emergency equipment station and in communication with the emergency equipment station, the central station configured to receive data from the emergency equipment station that is powered by the at least one energy harvesting device.

These and other implementations can optionally include one or more of the following features. The emergency assistance device may include a microcontroller for supplying power for the plurality of modules of the at least one emergency equipment station. The emergency assistance device may also include a microcontroller for supplying power for the plurality of modules of the at least one emergency equipment station. The microcontroller may be configured to transmit information representative of an operational state of the plurality of modules to the central station. The emergency assistance device may include at least one of a fire extinguisher, a fire pull alarm, an emergency lighting device and a defibrillator. The at least one energy harvesting device may be configured to harvest energy from a manmade power source. The microcontroller may be configured to convert power.

In general, another aspect of the subject matter described in this specification can be embodied in apparatus for remote inspection of portable tanks. The apparatus includes a gauge powered, at least in part, by an energy harvesting device and configured to be in communication with a volume defined by a portable tank for detection and display of pressure condition of the content contained within the volume; and an electronic circuit disposed in communication with the gauge and adapted to signal to a remote central station upon detection of predetermined conditions comprising at least one predetermined internal condition, the at least one predetermined internal condition comprising an out-of-range pressure condition of contents contained within the volume of the portable tank, and said apparatus comprising at least one detector for the at least one predetermined internal condition comprising said gauge for detecting the out-of-range pressure condition of content contained within the volume of the portable tank.

These and other implementations can optionally include one or more of the following features. The predetermined conditions may further include at least one predetermined external condition, the at least one predetermined external condition comprising at least lack of presence of a portable tank in its installed position, and presence of an obstruction to viewing of or access to the portable tank. The electronic circuit may include at least one detector for the at least one predetermined internal condition, said at least one detector for the at least one predetermined internal condition being adapted to initiate a signal to the remote central station upon detection of the at least one predetermined internal condition.

In general, still another aspect of the subject matter described in this specification can be embodied in a system. The system includes at least one energy harvesting device, and a network of emergency equipment stations, wherein each emergency equipment station includes an emergency assistance device and a plurality of sensors powered, at least in part, by the at least one energy harvesting device, each of the plurality of sensors is configured to sense at least one selectable predetermined condition. The system also includes a central station configured to distribute power provided by the at least one energy harvesting device to the network of emergency equipment stations. The system also includes a central station configured to distribute power harvested by the plurality of energy harvesting devices to the network of emergency equipment stations.

These and other implementations can optionally include one or more of the following features. The at least one energy harvesting device may be configured to harvest energy from a manmade power source. The network of emergency equipment stations may include a mesh network configuration.

The details of several implementations of various aspects of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
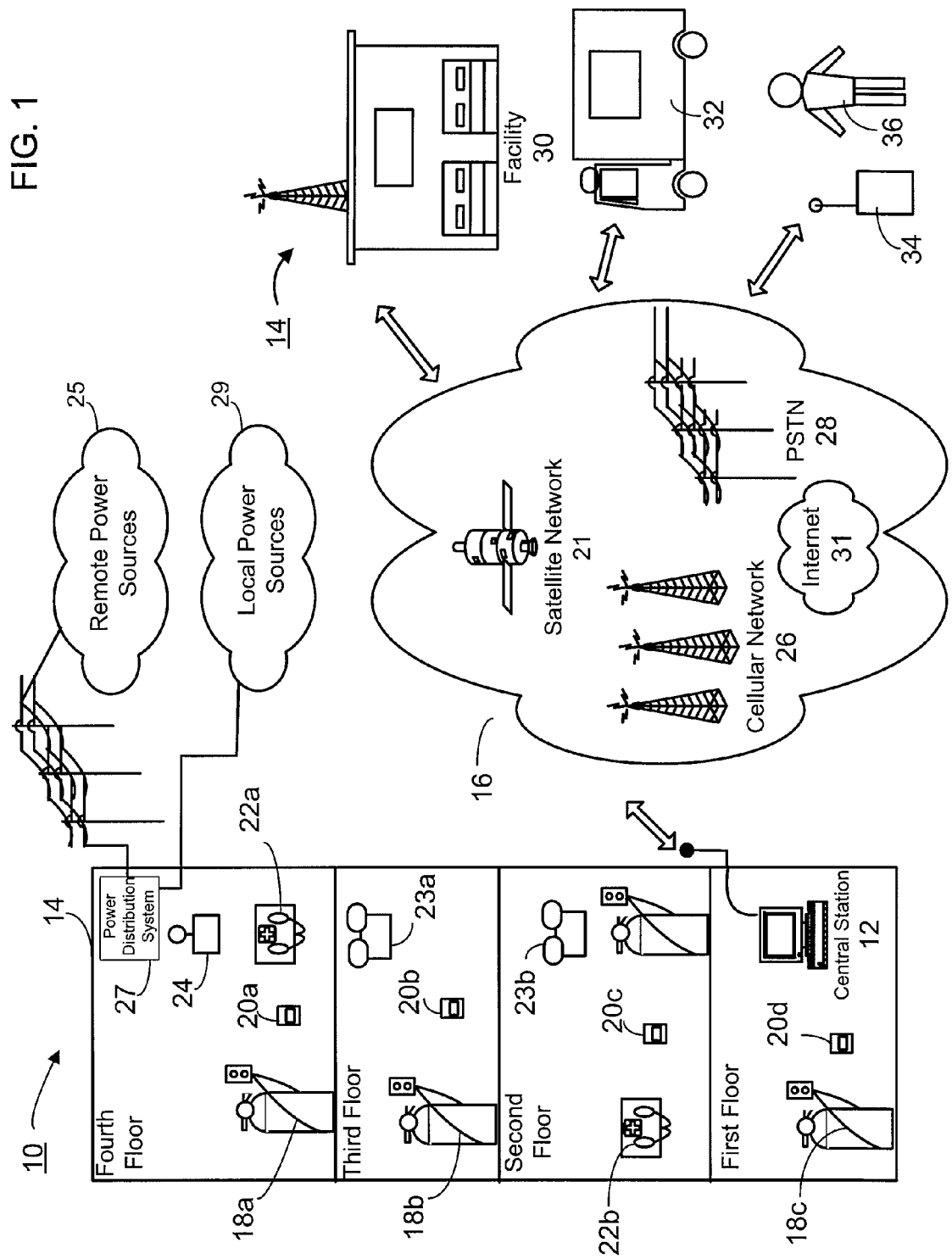
FIG. 1 is a diagram of a system for communicating information collected at a network of emergency equipment stations to various locations.

Referring to FIG. 1, a system 10 for remote tracking of objects with emergency equipment is distributed throughout (e.g., in rooms, hallways, etc.) a healthcare facility (e.g., a hospital, assisted living facility, a nursing home, etc.), a commercial facility (e.g., a shopping mall, restaurant, dance club, gymnasium, etc.), an educational institution (e.g., a college campus, dormitory, etc.), a residence (e.g., a residential home, residential development, apartment complex, condominium complex, etc.), or other facility (e.g., an airport, train station, bus station, etc.). In this particular example, emergency equipment stations are distributed throughout four floors of a building 14. Each emergency equipment station includes an emergency assistance device (e.g., a fire extinguisher, fire pull alarm, emergency egress lighting, emergency lighting, defibrillator, etc.) and one or more sensors adapted to sense various internal and external conditions (e.g., ambient air temperature, presence of an obstruction blocking access to emergency assistance device, etc.). Each emergency equipment station also includes equipment for detecting objects such as people (e.g., emergency personnel, employees, students, prisoners, etc.), packages (e.g., crates, mail parcels, etc.), equipment (e.g., vehicles associated with a facility) and other types of objects worthy of being tracked.

System 10 includes remote central station 12 located in the building 14 that is in communication with other facilities (e.g., buildings), vehicles and individuals via a communication medium 16 such as a satellite network 21, cellular network 26, public switched telephone network (PSTN) 28, or a computer network such as the Internet 31. In general, remote central station 12 remotely monitors receives information from a network of emergency equipment stations, e.g., fire extinguisher stations 18a-c, fire alarm pull stations 20a-d, defibrillator stations 22a-b, emergency lighting stations 23a-b, and emergency egress station 24, for assistance with tracking objects located and moving within the building 14. Each emergency equipment station includes sensors and circuitry for monitoring internal and/or external conditions such as ambient air temperature, presence of an obstruction in front of the equipment, removal of the equipment from an installed position, etc. Additionally, each emergency equipment station (or device) includes sensors and circuitry for sensing and detecting objects.

Upon detection of one or more objects, remote central station 12 is configured to relay information about the detected object and/or external conditions to one or more destinations (e.g., another facility 30, vehicle 32, personnel 36). In some arrangements, along with detecting objects, the emergency equipment is capable of processing detection information to track the objects or to assist with tracking the objects. For example an object may be tracked as it is moved from the second floor to fourth floor of the building 14. Processing for object tracking may be partially or completely executed remote from the emergency equipment stations. For example object tracking may be executed at the remote central station 12, the facility 30, vehicle 32 or at the location of the personnel 36. Along with object tracking, additional internal and external conditions associated with the emergency equipment stations and devices may be monitored. For example, ambient temperature may be monitored by the network of emergency equipment and remote central station 12 may be configured to transmit temperature data to destinations such as facility 30, vehicle 32 and personnel 36. By receiving this data, facilities and personnel (e.g., a fire department and emergency response personnel) can be provided with a temperature map of each floor of the building 14 to assist during particular events (e.g., suspected fires).

To provide energy for the emergency equipment devices, the emergency equipment stations 18a-c, 22a-b, the central station 12 and other energy consuming devices, the system 10 includes power sources that may be positioned relatively local or remotely located. Remote power sources 25 such as power plants (e.g., nuclear, hydro-electric, etc.) can generate electricity that is provided (e.g., over power lines) to the building 14 and provided to a power distribution system 27 that correspondingly provides electricity to the emergency equipment stations for consumption. In general, the power distribution system 27 may include power interfaces, panel junctions, power wiring and other types of equipment and hardware needed for power delivery to the stations and emergency equipment. Processing capabilities of such an electric power distribution system 27 may generally include power step-up or step-down operations using various types of transformers and connection configurations. In one example, a power distribution automation (DA) system can also be implemented to record various system performance parameters (e.g., voltage, current, switch status, temperature, and oil level) using a plurality of distribution transformers and feeders. These system quantities may be transmitted on-line to the local power sources 29 through a variety of communication media. The media could be either wireless (e.g., radio, and pager) or wired (e.g., Dial-up telephone, RS-485 multi-drop, and Ethernet). The measured field data can be processed at the local power sources 29 for display of any selected system quantity through a Graphic User Interface (GUI) (not shown). In the event of a monitored system parameter exceeding a pre-defined threshold, an alarm may be automatically generated for human operator intervention. For example, any control action (for opening or closing of the switch or circuit breaker) may be initiated by the operator and transmitted from the local power sources 29 through the communication media to a specific emergency equipment station (e.g., fire extinguisher stations 18a-c) associated with the corresponding switch or circuit breaker. The desired switching action may subsequently takes place and the action can be acknowledged back to the human operator for information. Local power sources 29 may also be used, individually or in concert with the remote power sources 25, for electricity generation and delivery. For example, rechargeable batteries may serve as one type of a local power source 29, which can be charged and re-charged from energy provided by one or more of the remote power sources 25 (or one or more other local power sources 29).

Along with the facilitation of proper power delivery, the system 10 is capable of monitoring and exchanging data with various emergency equipment stations throughout the building 14. For example, among the types of information being monitored by the emergency equipment stations 18a-c and the central station 12, information associated with power delivery and consumption may be monitored. For example, consumption rates and disruptions in power delivery may be monitored by the corresponding emergency equipment station and the central station 12. By being provided to the remote central station 12, the information may be sent via the communication medium 16 to one or more destinations of interest. Various data transmission techniques and methodologies may be implemented for providing information to the facilities, vehicles and personnel. For example, power delivery data transmitted by the remote central station 12 may be received by a communications device (e.g., dial up modem, cable modem, cellular modem, computer network interface card, etc.) at a computer at the facility 30, a computer installed or present within the vehicle 32 (e.g., a fire truck, passenger car), and/or a hand held device 34 (e.g., a tablet computer, personal data assistant, cellular device, pager, etc.) carried by the person 36. In another example, the remote central station 12 may be configured to adjust data from one or more sources (e.g., facility 30, vehicle 32, handheld device 34) that are used for various operations such as modifying diagnostic operations at one or more of the emergency equipment stations and adjust transmission and reception parameters and protocols (e.g., operational frequency, transmission power, gain settings, etc.), etc.

To assist in information monitoring and adjustments, bidirectional information and data transmissions may occur between one or more of the facilities and devices included in the system 10. For example, the remote central station 12 may be configured to receive data from one or more sources (e.g., facility 30, vehicle 32, handheld device 34) that may be used for various operations such as initiating power interruption diagnostic operations at one or more of the emergency equipment stations, adjusting power delivery and consumption, etc.

Figure 2:
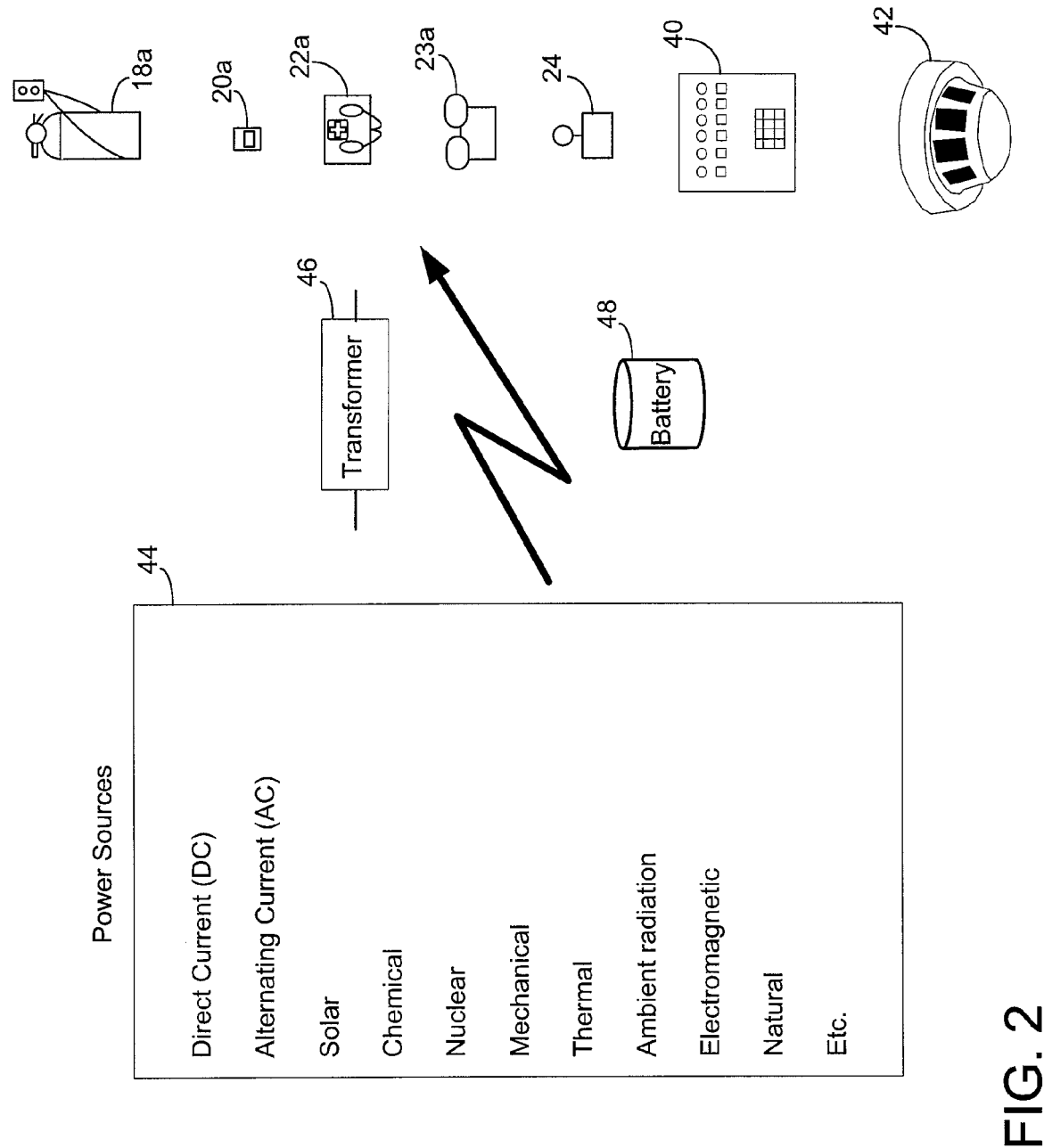
FIG. 2 is a diagram of representative power sources for emergency equipment and emergency equipment stations.

Referring to FIG. 2, various types of emergency equipment are shown, such as fire extinguisher station 18a, fire alarm pull station 20a, defibrillator station 22a, emergency lighting station 23a and emergency egress station 24, emergency interface panel station 40 and smoke detector station 42. Each type of emergency equipment is configured to monitor various internal and/or external conditions (e.g., power consumption, disruption in power, etc.) and is in communication with the remote central station 12 over a communications link (e.g., a wireless link, hardwire connection, a combination thereof, etc.). In one wireless communication implementation, a wireless repeater mesh network may be employed to relay a power transmission signal from the power distribution system 27 to one or more of the emergency equipment stations and to the remote central station 12. For example, the plurality of emergency equipment stations may each have a receiver and a transmitter. The receiver may receive the data from a node in the mesh network and the transmitter may transmit the data to a next node. In some implementations, the data may be updated while being transmitted over the network. Now assume a situation where data on a last known location (e.g., location A) of an object is being transmitted via an emergency equipment station in the mesh network. Before relaying the data to a next node in the network, the station senses or receives data that the object has moved to another location B. In such a situation, the station may update the data on the location of the object before relaying it to the next node. In some implementations, a history of the last known locations may be transmitted in order to track a movement of the object. In addition, the mesh network can also be configured to allocate power harvested through different techniques and locations to various emergency equipment stations throughout the building 14. For example, the fire extinguisher 18a located on the fourth floor of the building 14 may be powered by solar energy while 18c on the first floor is energized by chemical harvesting technique. From a systematic point of view, mesh network can collectively gather information regarding different types of emergency equipment stations and available power sources, thereby implementing an efficient power distribution scheme to accommodate different power requirements.

A list 44 of various types of manmade and natural power sources are provided that may be implemented as the local power sources 29, the remote power sources 25, or a combination of both. Along with alternating current (AC) and direct current (DC) power sources, power sources associated with a technique referred as energy harvesting may be implemented. In general, energy harvesting (also referred to as power harvesting or energy scavenging) is associated with one or more processes by which energy is captured and stored, often by small autonomous devices such as sensors, and devices associated with equipment and equipment stations (e.g., emergency equipment stations) included in a network. A variety of types of power may be exploited for harvesting energy, such as solar power, thermal energy, wind energy, salinity gradients, kinetic energy, tidal energy, etc. While such large-scale ambient energy, such as solar, wind and tides, is widely available, harvesting of the energy may present challenges.

In general, energy harvesting devices, which may be incorporated into the emergency equipment stations, or separate from the stations, use energy conversion to generate electricity. For example, mechanical energy may be converted into electrical energy, random motion (e.g., ocean waves) may be converted into electricity, etc. Remote power sources 25 that implement energy harvesting techniques may be deployed at remote locations to serve as reliable power stations for each of the emergency equipment stations included in system 10. As such, the energy harvesting devices may be sufficiently robust to endure long-term exposure to hostile environments and have a broad range of dynamic sensitivity for energy collection (from the sun, wave motion, etc.).

By capturing minute amounts of energy from one or more naturally-occurring energy sources (that are potentially inexhaustible), the energy (e.g., electrical energy) may be accumulated and stored (e.g., in batteries 48) for later use. In addition to using the harvested energy as a primary energy source (and directly providing the energy, e.g., via a transformer 46), harvested energy can be used as an alternative energy source to supplement a primary power source (e.g., a remotely located electrical power plant) and to enhance the reliability of the system 10 and prevent power interruptions.

Various types of energy may be used for harvesting energy, for example, mechanical energy sources (e.g., vibration, mechanical stress and strain, etc.), thermal energy sources (e.g., waste energy from furnaces, heaters, friction sources, etc.), ambient radiation such as light energy (e.g., captured from sunlight or room light via photo sensors, photo diodes, solar panels, etc.), electromagnetic energy (e.g., provided by inductors, coils, transformers, etc.), environmentally-based energy (e.g., wind, water flow, ocean currents, solar, etc.), organism-based energy (e.g., mechanical and thermal energy generated from bio-organisms or through actions such as walking and sitting, etc.), and other energy sources such as chemical and biological sources.

Various type of devices may be used for energy harvesting, that may or may not be scaleable dependent upon the size and application. For example, a device that uses piezoelectric crystals, which generate a voltage upon being mechanically deformed, may provide energy generation (for storage and use). Vibration from mechanical devices such as engines can stimulate the piezoelectric crystals along with other types of vibration sources (e.g., movement of a person). Kinetic devices, such as the devices used in wristwatches may also be used for energy generation. Thermoelectric generators produce energy from the heat difference between two objects. One or more antennas may be used to collect energy from radio waves or radiation in other portions of the electromagnetic spectrum.

Ambient-radiation may be collected from ubiquitous radio transmitters, however, for a considerable amount of energy, either a large collection area or close proximity to the radiating source may be needed.

For piezoelectric energy harvesting, the piezoelectric effect, which converts mechanical strain into electrical current or voltage, may be exploited. Many different sources may be used to produce the mechanical strain, for example, human motion, low-frequency seismic vibrations, and acoustic noise may be tapped to harvest energy. Piezoelectric electrical energy sources typically produce power on the order of milliwatts, which while relatively small, can be used to charge one or more batteries. In one arrangement, piezoelectric elements may be embedded in hallways or walkways to recover the "people energy" of footsteps that may used to charge batteries (or directly power) the various types of emergency devices and emergency equipment mentioned above.

Pyroelectric energy may also be harvested by using the pyroelectric effect, which converts a temperature change into electrical current or voltage. Similar to the piezoelectric effect, the pyroelectric effect is associated with a type of ferroelectric behavior. Like piezoelectricity, pyroelectricity typically needs some form of time-varying inputs and provides relatively small output energy levels, however in some implementations energy may be harvested and collectively stored (in a battery) for use.

Energy such as an electrical voltage may be produced from the thermal gradient that is formed between two dissimilar conductors. Such a phenomena, referred to as thermoelectric effect, produces a heat flow from the thermal gradient and produces a diffusion of charge carriers that causes a voltage difference. Devices that produce such electrical voltages, referred to as thermocouples may also be used for battery charging or directly providing power to emergency equipment and emergency equipment stations.

Other types of energy harvesting techniques may also be implemented. For example, devices may implement electrostatic (capacitive) energy harvesting that is based on the changing capacitance of vibration-dependent varactors. Mechanical energy is converted into electrical energy by vibrating plates of a charged varactor (a variable capacitor). Electroactive polymers (EAPs) may also be used for harvesting energy. Such polymers have a large strain, elastic energy density, and high energy conversion efficiency that may be used in battery charging and directly providing power with or with additional circuitry (e.g., a transformer, etc.).

Figure 3:
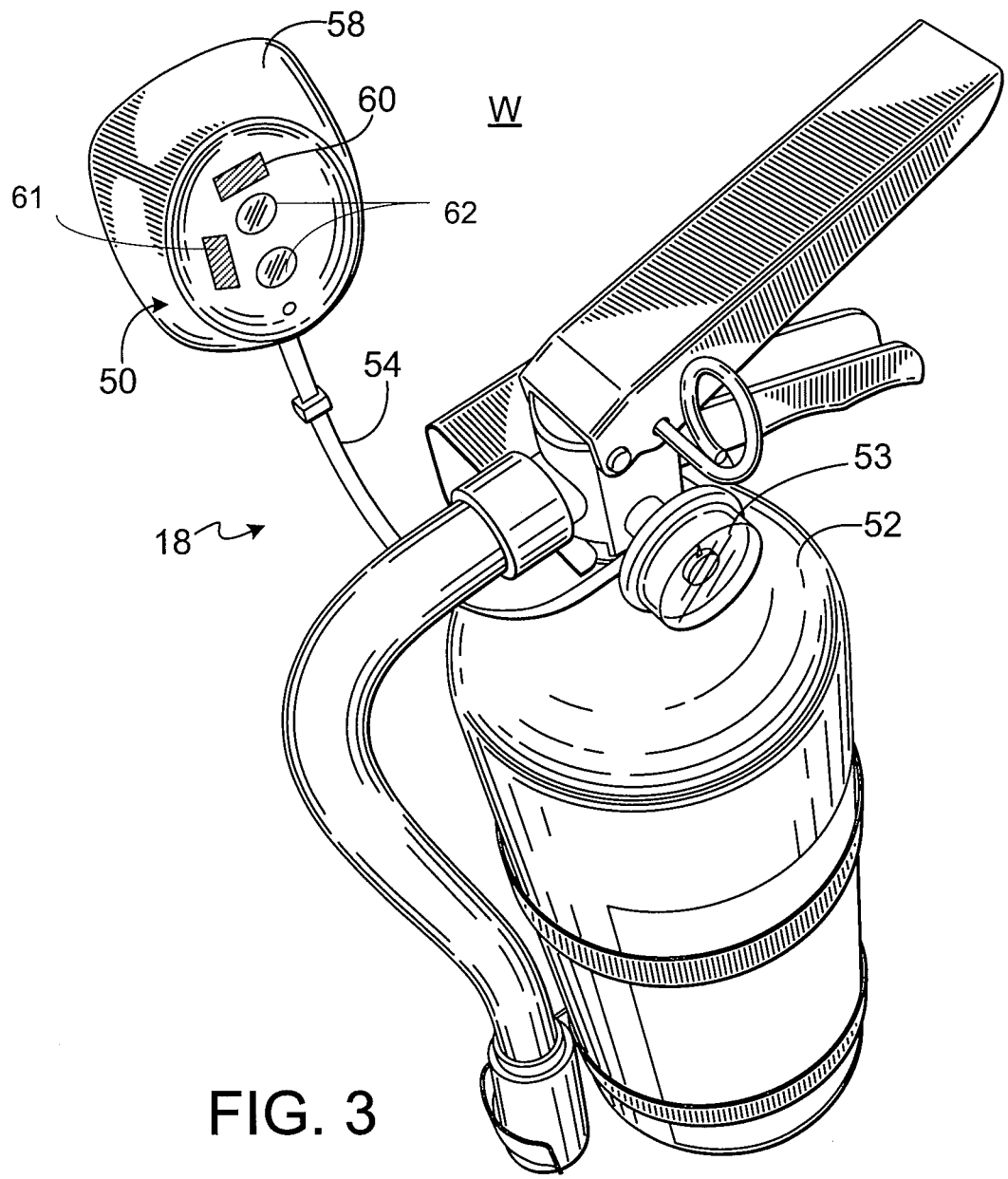
FIGS. 3-4 are perspective views of a fire extinguisher station.
Figure 4:
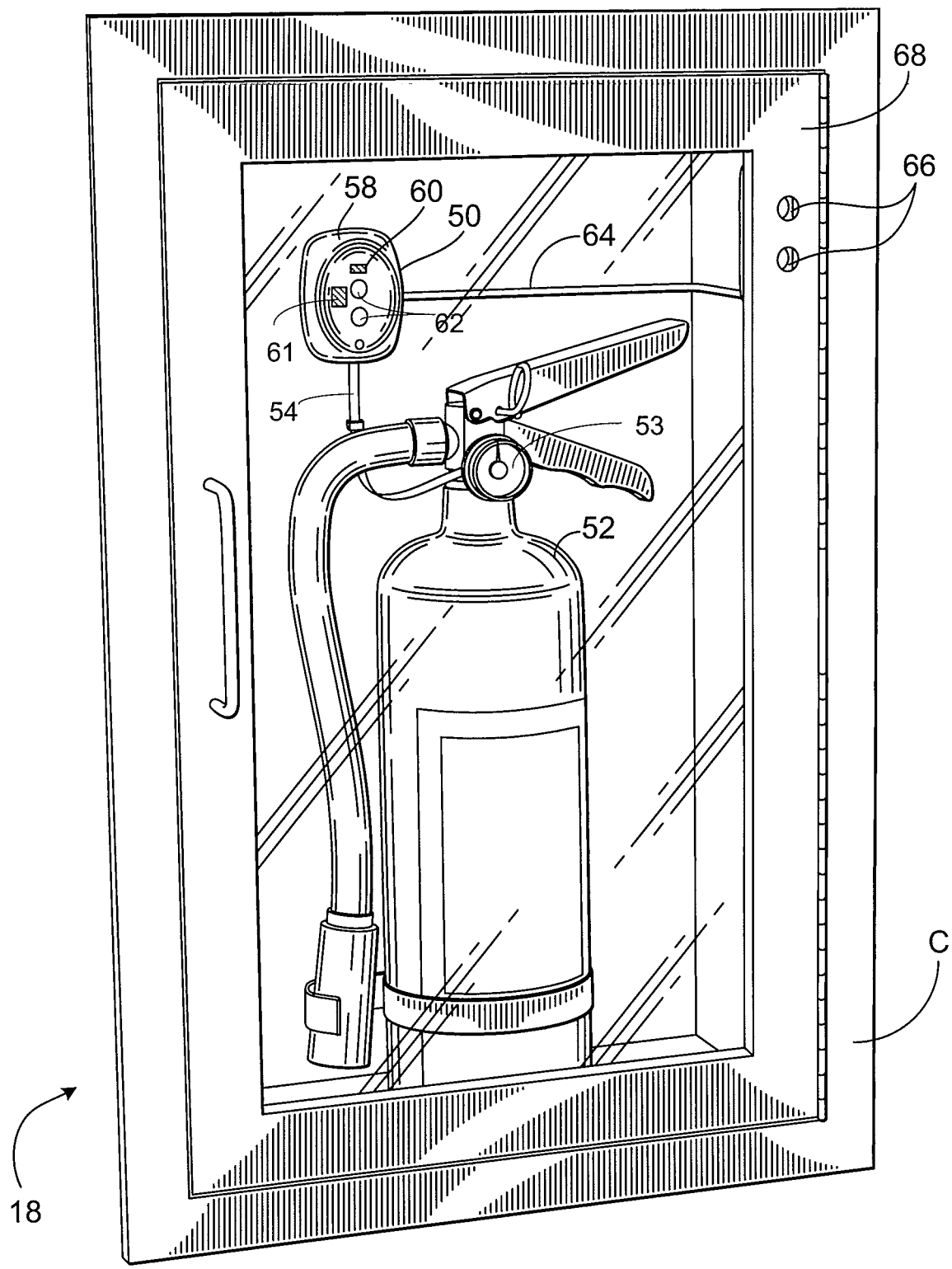

It is useful to power various emergency equipment stations illustrated in FIG. 1 throughout the building 14 using the above-mentioned harvested energy techniques. Referring to FIGS. 3 and 4, the fire extinguisher station 18 in FIG. 1 can be mounted to a wall, post, or other support surface, W, or mounted within a wall box or cabinet, C, that is located in the building 14. The fire extinguisher station 18 typically includes a fire extinguisher tank 52 containing a fire extinguishing material, e.g., water, dry chemical or gas, and a fire extinguisher valve assembly, as described in U.S. Pat. No. 6,585,055, U.S. Pat. No. 7,188,679, U.S. Pat. No. 7,450,020, U.S. Pat. No. 5,848,651, and U.S. Pat. No. 6,311,779, the complete disclosures of which are incorporated herein by reference in their entirety. The valve assembly may include, among other things, a gauge 53 to provide indication of the pressure status of fire extinguishing material within the fire extinguisher tank 52. The fire extinguisher station 18 also includes a docking station 50 fixedly mounted to the wall, W, at a predetermined position. In some implementations, the docking station 50 includes a housing 58 containing, a sonar module 61 and defining spaced apertures or windows 62 through which the module 61 emits and receives ultrasonic signals. (In the embodiment of FIG. 4, where the docking station 30 is disposed within a wall cabinet, C, the sonar module 61 is connected, e.g., by cable 64, to apertures or windows 66 in the outer surface of the cabinet door 68.) Also, disposed within the docking station housing 58 is a microcontroller 60, as described more fully below with reference to FIG. 5. Extending generally from the base of the docketing station housing 50 is the electronics and communications tether 54 terminating, for example, in a male connector element sized and configured to be received within the female electronics and communications socket defined in the rear surface of the valve gauge housing 53. The length of the tether 54 and the tenacity of engagement of the male connector element within the female socket at the connection are preferably selected so that any significant movement of the fire extinguisher 52 relative to its installed position will result in dislodgement of the connection and initiating a signal to the remote central station 12. The docking station 30 may be powered by alternating current, e.g., by the power distribution system 27, or it may be powered by its energy harvesting mechanism afforded by the microcontroller 60. If powered by alternating current, an auxiliary power supply, e.g., in the form of battery, may be provided in case of power outage.

Figure 5:
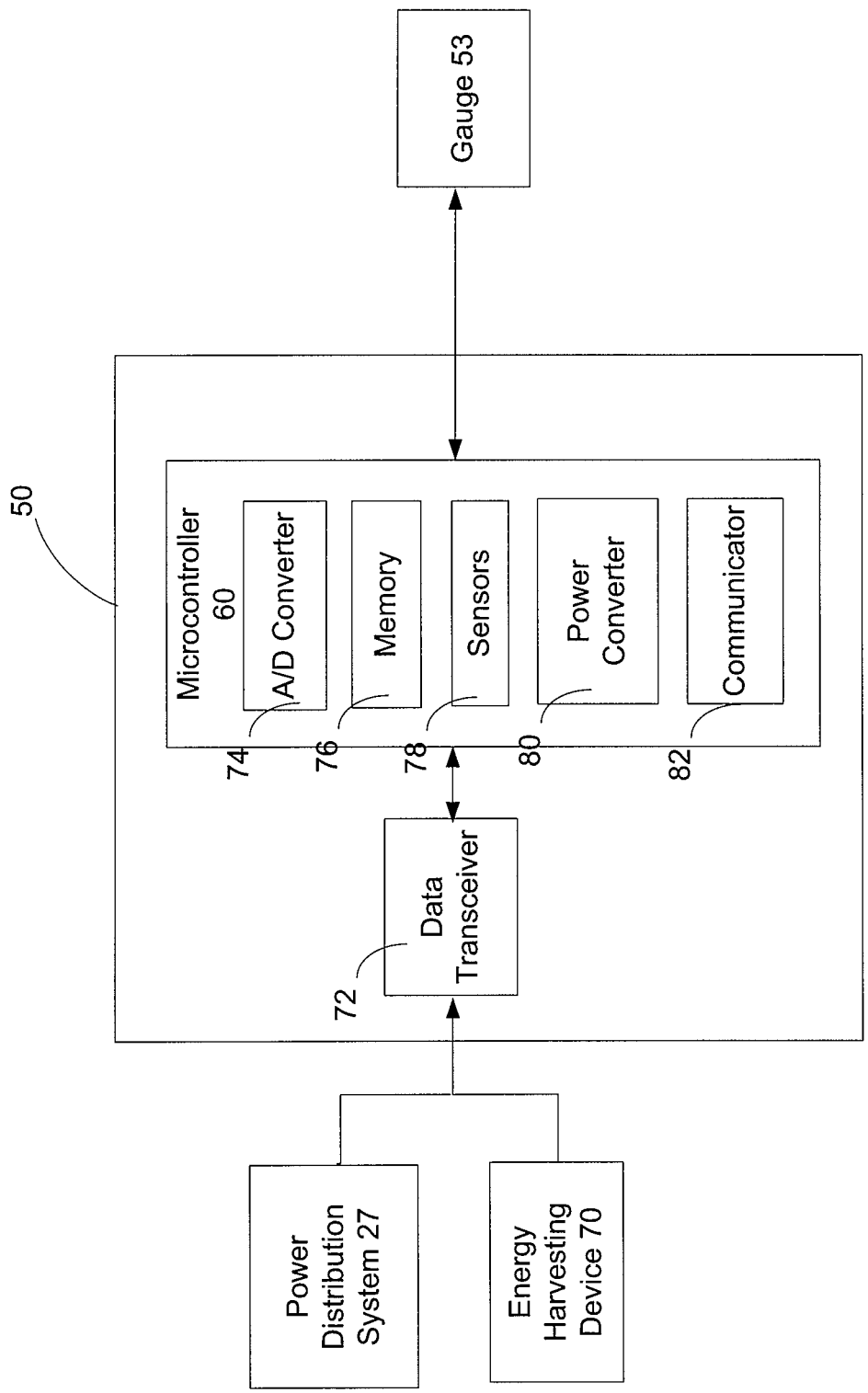
FIG. 5 is a diagram of a docking station of an emergency equipment station.

Referring to FIG. 5, the microcontroller 60 of the docking station 50 can be used in concert with circuitry and modules included in the housing 58 to energize the fire extinguisher station 18 and its associated electronic circuitry, modules and devices. Such a microcontroller can also be implemented in other emergency equipment stations to provide desirable energy supply schemes. In one example, as mentioned above in FIG. 1, power supplied from the remote sources 25, is locally distributed by power distribution system 27 to various emergency equipment stations throughout the building 14. As such, the microcontroller 60 can use a data transceiver 72 to communicate with the power distribution system 27 through wireless link (e.g., using a stand-alone antenna or an on-chip antenna) or hardware wiring (e.g., cable). The power transmission received in the power converter 80 may be further converted to accommodate different power consumption requirements to serve different modules (e.g., the sonar module 61 and the gauge 53) of the extinguisher station 18. In the meantime, the microcontroller 60 also includes data transmission and control mechanism to interact with these different modules. For example, data inputs (analog or digital) may be fed to the microcontroller 60 by using various sensors 78, analog to digital (A/D) converter 74 and memory 76. Subsequently, the microcontroller 60 may issue commands to control or optimize calibration, power switching, energy management configuration in connection with the power consumption requirement of each individual module.

In another example, the microcontroller 60 may receive and process data received from one or more energy harvesting devices that are strategically located inside or outside the building 14 to capture energy in various forms (e.g., solar, room light, sound and kinetic energy). For instance, as mentioned above, piezoelectric elements may be embedded in hallways or walkways to convert the "people energy" of footsteps into a voltage that charges a capacitor on the microcontroller 60, thereby providing a power source. The power converter 80 and communicator 82 may subsequently be used to covert such energy into appropriate DC power required by other modules of the fire extinguisher station 18. For example, the gauge 53, powered by the microcontroller 60, may use a Hall Effect sensor (not shown) installed at the rear surface of the gauge scale to monitor the volume of the fire extinguisher material inside the tank 52. Additionally, the microcontroller 60 may also include electronics and communications circuitry, e.g., disposed primarily within the docking station 30, for initiating signals to the remote central station 12 upon detection of predetermined internal and/or predetermined external conditions. For example, referring again to FIG. 1, the circuitry can issue a signal upon detection of a predetermined external condition, e.g., lack of presence of the fire extinguisher 52 at its installed position at the fire extinguisher station 18, when the fire extinguisher 52 is removed, or an obstruction to viewing of or access to a fire extinguisher station 18. The circuitry also issues a signal upon detection of a predetermined internal condition, e.g., existence of an out-of-range, e.g., low or high pressure condition of the fire extinguishing material contained within the fire extinguisher tank 52.

A number of embodiments of the invention have been described. Nevertheless, it will be understood that various modifications may be made without departing from the spirit and scope of the invention. For example, wireless signaling technology may incorporate telecommunication schemes (e.g., Bluetooth or similar) to provide point-to-point or multi-point communication connections among, e.g., fire extinguisher stations and/or other emergency equipment stations (e.g., a defibrillator station) and/or the remote central station. These telecommunication schemes may be achieved, for example, with local wireless technology, cellular technology, and/or satellite technology. The wireless signaling technology may further incorporate spread spectrum techniques (e.g., frequency hopping) to allow the emergency equipment stations to communicate in areas containing electromagnetic interference. The wireless signaling may also incorporate identification encoding along with encryption/decryption techniques and verification techniques to provide secure data transfers among the devices.

In other embodiments, the emergency equipment stations (e.g., a defibrillator station) and/or remote central station may include or otherwise be associated with a Global Positioning System (GPS). GPS may be used to determine, for example, the geographic location of each emergency equipment station and provide location coordinates, via the wireless signaling technology, to the other emergency equipment stations (e.g., the defibrillator station) and/or the remote central station. Thus, the GPS system may provide the location of the fire alarm pull stations and allow, for example, tracking of the frequency that stations located in a particular region of a facility are obstructed.

Also, the signaling may use networking techniques to provide one-directional and/or multi-directional communications among the devices. In one example, signals from emergency equipment stations may be networked asynchronously, such as in an asynchronous transfer mode (ATM). The signals may also be networked synchronously, such as, for example, in a synchronous optical network (SONET). In still another example, the signals may be transmitted over a landline in an integrated services digital network (ISDN), as well as over other similar media, for example, in a broadband ISDN (BISDN).

Accordingly, other embodiments are within the scope of the following claims.

What is claimed is:

1. A system comprising:
    at least one energy harvesting device for harvesting energy from inside a building;
    at least one emergency equipment station that includes an emergency assistance device and a plurality of modules powered, at least in part, by the at least one energy harvesting device, wherein the at least one energy harvesting device is a small autonomous device associated with the at least one emergency equipment station;
    communications circuitry for the at least one emergency equipment station;
    a microcontroller in the at least one emergency equipment station, wherein the microcontroller is configured to receive and process data from the at least one energy harvesting device and the plurality of modules, wherein the microcontroller allocates power harvested by the energy harvesting device to the plurality of modules, and wherein the microcontroller transmits power distribution data through the communications circuitry; and
    a central station located remotely from the emergency equipment station and in wireless communication with the emergency equipment station, the central station configured to receive power distribution data from the communications circuitry of the emergency equipment station that is powered by the at least one energy harvesting device.

2. The system of claim 1, wherein the microcontroller is configured to transmit information representative of an operational state of the plurality of modules to the central station.

3. The system of claim 1, wherein the emergency assistance device comprises at least one of a fire extinguisher, a fire pull alarm, an emergency lighting device and a defibrillator.

4. The system of claim 1, wherein the at least one energy harvesting device is configured to harvest energy from a manmade power source.

5. The system of claim 1, wherein the microcontroller is configured to convert power.

6. An apparatus comprising:
    a gauge powered, at least in part, by an energy harvesting device and configured to be in communication with a volume defined by a portable tank for detection and display of pressure condition of the content contained within the volume, wherein the energy harvesting device is a small autonomous device associated with the gauge and configured to harvest energy from inside a building;
    a microprocessor configured to receive and process data from the energy harvesting device and one or more modules of the gauge, wherein the microprocessor allocates power harvested by the energy harvesting device to the one or more modules of the gauge, and wherein the microprocessor transmits power distribution data through communications circuitry; and
    an electronic circuit disposed in communication with the gauge and adapted to signal to a remote central station upon detection of predetermined conditions comprising at least one predetermined internal condition, the at least one predetermined internal condition comprising an out-of-range pressure condition of contents contained within the volume of the portable tank, and said apparatus comprising at least one detector for the at least one predetermined internal condition comprising said gauge for detecting the out-of-range pressure condition of content contained within the volume of the portable tank.

7. The apparatus for remote inspection of claim 6, wherein the predetermined conditions further comprise at least one predetermined external condition, the at least one predetermined external condition comprising at least lack of presence of a portable tank in its installed position, and presence of an obstruction to viewing of or access to the portable tank.

8. The apparatus for remote inspection of claim 6, wherein the electronic circuit comprises at least one detector for the at least one predetermined internal condition, said at least one detector for the at least one predetermined internal condition being adapted to initiate a signal to the remote central station upon detection of the at least one predetermined internal condition.

9. The system of claim 1 wherein the at least one energy harvesting device includes a piezoelectric crystal for harvesting electrical energy from mechanical strains.

10. The system of claim 1 wherein the at least one energy harvesting device includes one or more antennas to collect energy from radio waves.

11. The system of claim 1 wherein the at least one energy harvesting device includes a solar panel for harvesting electrical energy from ambient light energy.

* * * * *